(12) United States Patent
Melgaard

(10) Patent No.: US 8,308,356 B2
(45) Date of Patent: Nov. 13, 2012

(54) ENCLOSURE AND METHOD FOR TEMPERATURE-SENSITIVE COMPONENTS

(75) Inventor: Hans L. Melgaard, North Oaks, MN (US)

(73) Assignee: Despatch Industries Limited Partnership, Lakeville, MN (US)

( * ) Notice: Subject to any disclaimer, the term of this patent is extended or adjusted under 35 U.S.C. 154(b) by 0 days.

(21) Appl. No.: 13/060,651

(22) PCT Filed: Aug. 25, 2009

(86) PCT No.: PCT/US2009/054877
§ 371 (c)(1),
(2), (4) Date: Mar. 23, 2011

(87) PCT Pub. No.: WO2010/025129
PCT Pub. Date: Mar. 4, 2010

(65) Prior Publication Data
US 2011/0188538 A1    Aug. 4, 2011

Related U.S. Application Data

(60) Provisional application No. 61/091,583, filed on Aug. 25, 2008.

(51) Int. Cl.
*G01K 1/08* (2006.01)
*H05K 7/20* (2006.01)

(52) U.S. Cl. ........ 374/160; 374/141; 361/700; 361/704; 361/707

(58) Field of Classification Search .......... 374/141, 374/160; 361/700, 704, 707
See application file for complete search history.

(56) References Cited

U.S. PATENT DOCUMENTS

| | | | |
|---|---|---|---|
| 4,020,399 A * | 4/1977 | Suzuki et al. | 361/700 |
| 5,323,847 A | 6/1994 | Koizumi et al. | |
| 5,422,787 A | 6/1995 | Gourdine | |
| 5,477,409 A | 12/1995 | Sayka | |
| 5,697,840 A | 12/1997 | Bainbridge et al. | |
| 6,462,949 B1 | 10/2002 | Parish, IV et al. | |
| 7,265,979 B2 * | 9/2007 | Erturk et al. | 361/702 |
| 7,505,269 B1 * | 3/2009 | Cosley et al. | 361/700 |
| 2003/0147216 A1 | 8/2003 | Patel et al. | |
| 2011/0083459 A1 * | 4/2011 | Salyer | 62/238.3 |

OTHER PUBLICATIONS

International Search and the Written Opinion, dated Oct. 14, 2009 for corresponding PCT Application No. PCT/US2009/054877 (8 pages).

* cited by examiner

*Primary Examiner* — Lisa Caputo
*Assistant Examiner* — Mirellys Jagan
(74) *Attorney, Agent, or Firm* — Fredrikson & Byron, PA

(57) ABSTRACT

Protective enclosure and method for protecting heat sensitive, data recording devices in high temperature environments. The protective enclosure has a housing having at least one compartment for containing a heat sensitive, data recording device, e.g., a temperature recording device, and a jacket configured to contain a phase change material. The jacket may be vented and configured to at least partially surround the compartment. The housing may be sealed with an endcap. The recording device and a heat absorbing element are disposed within the same or within adjoining or adjacent subcompartments within the enclosure. In a method, the enclosure with heat absorbing element and temperature recording device is placed within a heated environment or environment to be heated, e.g., a furnace. The recording device is connected to a thermal couple.

9 Claims, 3 Drawing Sheets

ENCLOSURE AND METHOD FOR TEMPERATURE-SENSITIVE COMPONENTS

RELATED APPLICATIONS

The present application claims priority to International Application No. PCT/US2009/054877 filed Aug. 25, 2009, which in turn claims priority to U.S. Provisional Application No. 61/091,583 filed Aug. 25, 2008, the teachings of which are incorporated herein by reference.

FIELD OF THE INVENTION

The present invention relates to an enclosure and method. More particularly, the invention relates to an enclosure and method for protecting temperature sensitive devices exposed to high process temperature environments.

BACKGROUND OF THE INVENTION

A variety of ovens and furnaces are used to process workpieces or materials that require exposure to heat or heat treatment, often at specific controlled temperatures. Such workpieces or materials may include, for example, metals to be pre-heated, silicon wafers treated with dopant, materials for use in photovoltaic cells requiring conductive paste to be fused thereto, and any other workpieces or materials that require heat treatment, particularly at process temperatures. Processing may be carried out at temperatures ranging from 250° C. to 1200° C. which may be reached in, for example, infrared ovens and diffusion furnaces.

When exposed to such temperatures, whether for an extended period of time at the lower end of the temperature range or for a shorter period of time at the higher end of the temperature range, temperature measuring devices or other electronic components or elements may fail due to the exposure. It would be desirable to provide a means for protecting temperature sensitive electronic devices and components from effects of exposure to high process temperatures.

Thermocouple recording devices are available to record profiles through a diffusion furnace but they are limited to short durations at high process temperatures (e.g., less than 3 min. at 850° C.) since the amount or thickness of protective insulation is restricted by the short vertical clearance in the furnaces. Diffusion furnaces using a conveyor need >10 min. at ~850° C. to produce a PN junction in a solar cell; but most thermocouple recording devices cannot survive a 10 minute exposure at such a temperature.

Applicant has found that one way to achieve the low temperature profile and longer duration needed for such applications is to use phase change materials in addition to insulation to avoid damage to the electronic recording devices.

SUMMARY OF THE INVENTION

The invention is directed to a protective enclosure and methods utilizing the enclosure. The enclosure generally comprises a housing, at least one compartment, a heat absorbing element and a vented jacket configured to contain a liquid.

According to an embodiment of the invention, the protective enclosure has a housing for containing a device to be protected, a compartment for containing a heat absorbing element, and a jacket within the housing. The jacket is configured to contain a liquid and is operatively connected to a vent to allow for the release of vapors if the liquid vaporizes.

In another embodiment, the protective enclosure is comprised of a housing, a compartment within the housing for containing a least one heat absorbing element and at least one device to be protected, a jacket within the housing, and a vent operatively connected to the jacket. The jacket is configured to contain a liquid and to partially surround the compartment. In examples where the jacket contains water, the jacket may be referred to as a water jacket.

In yet another embodiment of the invention, the protective enclosure comprises a housing having an internal surface, and a compartment for containing a heat absorbing element and a device to be protected. The compartment has an external surface and is positioned or mounted within the housing with at least a portion of the compartment external surface being spaced away from the housing internal surface to define an internal volume. The spaced apart external surface and housing internal surface are configured to contain a liquid within the internal volume. A vent is connected to the housing and in flow through communication with the internal volume.

In yet a further embodiment of the protective enclosure of the invention, the enclosure is comprised a housing for containing a device to be protected, a compartment for containing one or more heat absorbing elements and one or more devices to be protected, and a vent. The housing has an internal wall. The compartment has an external compartment wall and an internal compartment wall. At least a portion of the external compartment wall is spaced away from the housing internal wall to define an internal volume for containing a liquid phase change material; and the vent is operatively connected to the housing and in flow through communication with the internal volume.

In any of the various embodiments of a protective enclosure according to the invention, the heat absorbing element can comprise a meltable solid that changes phase at a relatively low temperature, a solid-solid phase change material, a solid-liquid phase change material, a solid-gas phase change material, or a liquid gas phase change material. Also, in some embodiments of the enclosure of the invention, the compartment is comprised of a first subcompartment for containing a device to be protected and a second subcompartment for containing a heat absorbing element, the first and second subcompartments being adjacent to one or being located generally on opposite sides of the housing. In other words, the compartment may be separated into two or more subcompartments or a plurality of subcompartments. Further still, in some embodiments of the enclosure of the invention, the compartment can be comprised of three adjacent subcompartments, one subcompartment containing a device and two of the three subcompartments containing a heat absorbing element.

In some embodiments of the enclosure of the invention, the housing can be insulated. In one such embodiment, the housing as an external wall and an internal wall with a first layer of insulation disposed between the housing external wall and the housing internal wall. In some other embodiments of the enclosure of the invention, the compartment of the enclosure can have an internal wall and an external wall provided with an insulation layer or a second insulation layer disposed between the compartment external compartment wall and the compartment internal compartment wall.

The enclosure of various embodiments of the invention can also include one or more of the following features: an endcap; a compartment having two or more subcompartments; a compartment having three subcompartments with at least two heat absorbing elements and one device to be protected separately disposed within the subcompartments; and a plurality of heat absorbing elements and one or more devices to be protected disposed within a compartment.

In another aspect of the invention, methods are provided for protecting data recording devices and other temperature sensitive devices from exposure to heated environments. In some such methods, an enclosure according to an embodiment of the invention is provided. The enclosure may have a heat absorbing element and a device to be protected disposed within a compartment or subcompartment of the enclosure; and the enclosure may be placed within a heated environment or an environment to be heated.

In an embodiment of a method according to the invention, a method of measuring the internal temperature of a furnace is provided. The method of this embodiment comprises: placing a temperature recording device into a protective enclosure, the protective enclosure comprising a housing for containing the temperature recording device; a compartment for containing a heat absorbing or phase change element; a jacket around the compartment, the jacket configured to contain a liquid or other phase change material; and a vent operatively connected to the jacket to allow for the release of vapors if the liquid or other phase change material vaporizes. The method further comprises connecting a thermocouple to the temperature recording device so that the thermocouple is outside of the enclosure, and placing the enclosure containing the temperature recording device and the thermocouple in a furnace.

In another embodiment, a method of measuring the internal temperature of a furnace is provided. The method comprises placing a temperature recording device into a protective enclosure, the enclosure comprising a housing, a compartment within the housing for containing at least one heat absorbing element and at least one device to be protected, a water jacket within the housing, the jacket configured to contain liquid and to partially surround the compartment, and a vent operatively connected to the jacket. The method further comprises connecting a thermocouple to the temperature recording device so that the thermocouple is outside of the enclosure, and sealing the enclosure with an endcap, the thermocouple being connected to the device through the endcap.

In yet another embodiment, a method of measuring the internal temperature of a furnace is provided. The method comprises placing a temperature recording device into a protective enclosure, the protective enclosure comprising: a housing for containing the temperature recording device; a compartment for containing a heat absorbing element; a jacket around the compartment, the jacket configured to contain a liquid; and a vent operatively connected to the jacket to allow for the release of vapors if the liquid vaporizes. The method further comprises connecting a thermocouple to the temperature recording device so that the thermocouple is outside of the enclosure, and placing the enclosure containing the temperature recording device and the thermocouple in a furnace.

In yet another embodiment, a method of protecting a heat-sensitive data recording device is provided. The method comprises: placing the recording device into a protective enclosure, the protective enclosure comprising: a housing for containing the recording device; a compartment for containing a heat absorbing element; a jacket around the compartment, the jacket configured to contain a liquid; and a vent operatively connected to the jacket to allow for the release of vapors if the liquid vaporizes. The method further comprises placing the enclosure containing the recording device into a heated environment or an environment to be heated. The recording device may be in electronic communication with one or more external electronics devices. Such devices may include, but are not limited to, a computer, and any device configured to receive data, a signal or an output from the device. In some embodiments, the method further comprises connecting the recording device to an external electronic device which is external to the heated environment or the environment to be heated.

DETAILED DESCRIPTION OF THE INVENTION

The following detailed description is to be read with reference to the drawings, in which like elements in different drawings have like reference numbers. The drawings, which are not necessarily to scale, depict selected embodiments and are not intended to limit the scope of the invention. Skilled artisans will recognize that the given examples have many alternatives that fall within the scope of the invention.

Figure 1:
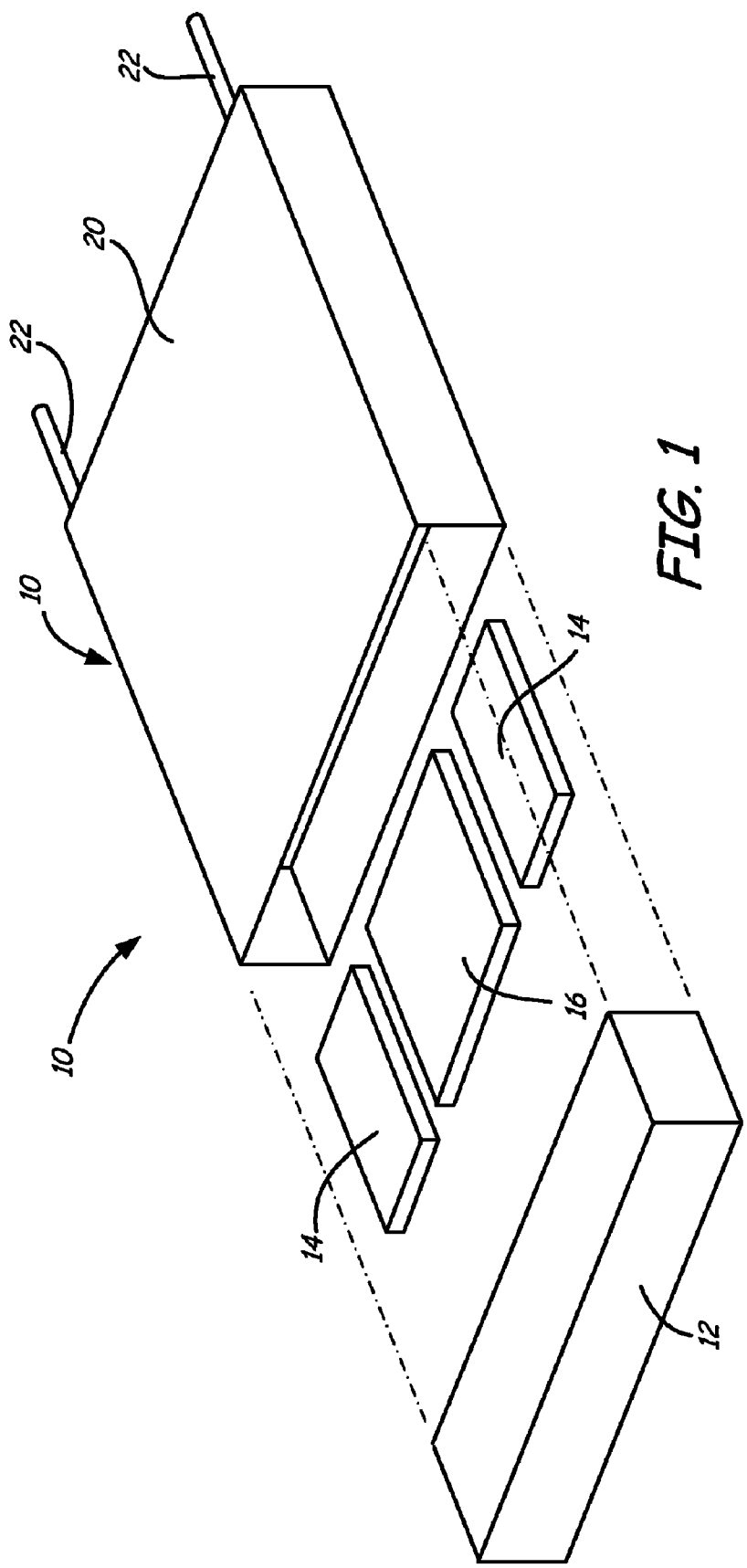
FIG. 1 is an exploded, perspective view of an enclosure according to an embodiment of the invention.
Figure 2:
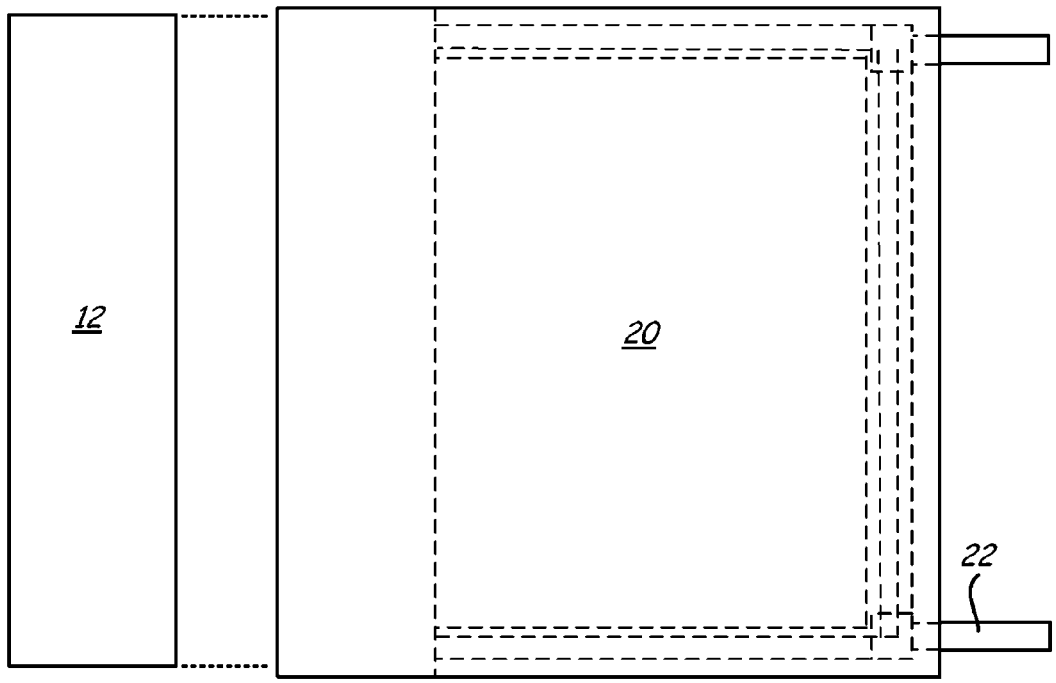
FIG. 2 is an exploded top view of an enclosure according to an embodiment of the invention.

Referring to FIG. 1, a protective enclosure 10 according to an embodiment of the invention is shown in exploded view. In the embodiment of FIG. 1 and FIG. 2, enclosure 10 has an endcap 12 and a housing 20. Also shown are heat absorbing or phase change elements 14 and a device to be protected 16. Device 16 may be a temperature sensitive component. For example, device 16 may be a temperature data recording device electrically coupled to a thermocouple (not shown in FIG. 1 and FIG. 2) that is positioned outside of protective enclosure 10. Phase change elements 14 and device 16 are received within compartments (not shown) within housing 20. Endcap 12 seals housing 20 and compartments and their contents from direct exposure to the heated environment of an oven or furnace or similar equipment in which protective enclosure 10 can be introduced during processing. As illustrated in FIG. 1 and FIG. 2, housing 20 is provided with two vents 22. It should be understood that housing 20 may be provided with one or more vents in different embodiments of the invention.

Figure 3:
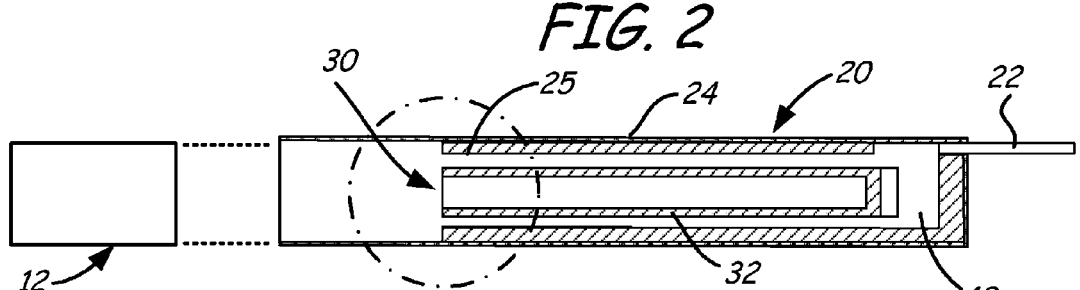
FIG. 3 is a side, cross-sectional view of an enclosure according to an embodiment of the invention.

Referring to FIG. 3, housing 20 is shown in cross-sectional view. With reference to this view along with FIGS. 4 and 5, the internal construction of this embodiment of housing 20 may be understood. Housing 20 has housing wall 24 defining an internal volume. Wall 24 may be formed of a material capable of withstanding the processing temperature to which it will be exposed without melting, burning, decomposing or otherwise being compromised during processing. One such material may be a metal, such as stainless steel, or a synthetic material, possibly with insulative properties, such as ceramic materials (e.g., alumina).

Figure 5:
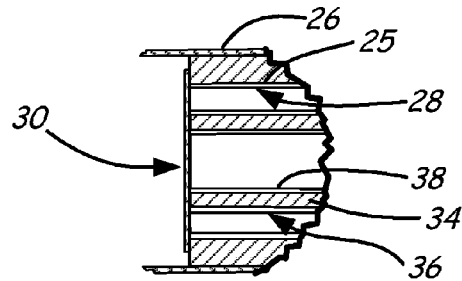
FIG. 5 is a partial cross-sectional view showing an exploded detail of FIG. 3.

In FIG. 3, housing 20 is illustrated with an insulative lining or first insulation layer 25. Referring to FIG. 5 in a partial cross-sectional view, an embodiment of housing 20 can be seen with first insulative layer 25 contained between a housing exterior wall 26 and a housing interior wall 28.

Figure 4:
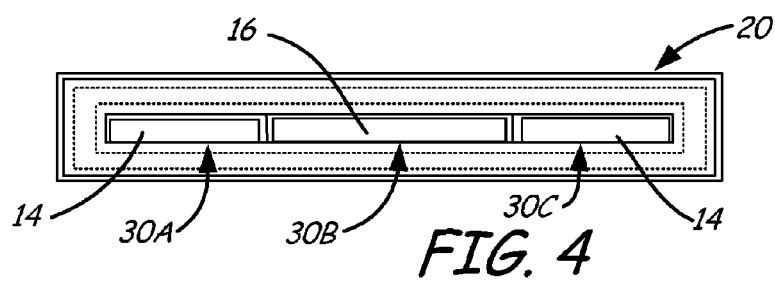
FIG. 4 is a front, cross-sectional view of an enclosure according to an embodiment of the invention.

Turning back to FIG. 3, within housing 20 is a compartment 30 configured to receive one or more phase change elements 14 and one or more devices 16. In the embodiment of FIG. 4, compartment 30 is configured to receive two phase change elements 14 with one device 16 disposed in between, in sub-compartments (or pockets) 30A, 30B and 30C. Referring to FIG. 3, compartment 30 has a compartment wall 32. Wall 32 may be formed of the same materials from which wall 24 is formed; however, additional suitable materials may include materials that are more heat sensitive than those materials suitable for use for housing wall 24 or exterior housing wall 26. Referring again to FIG. 5, the compartment in this embodiment is illustrated with an insulative lining or a second insulation layer 34 disposed between an exterior compartment wall 36 and an interior compartment wall 38.

At least a portion of the exterior surface of compartment 30 is spaced away from the interior surface of housing 20 so as to define an interior volume 40. Thus, it will be understood that compartment 30 is disposed within housing 20 in a spaced relationship. When housing wall 24 and compartment wall 32 are configured as illustrated in FIG. 5, interior volume 40 will be the space provided between exterior compartment wall 36 and interior housing wall 28. Interior volume 40 is in fluid communication with vent or vents 22. Vent 22 is operatively connected to the housing and configure to allow the release of vapors if a fluid or other phase change material within interior volume 40 vaporizes. The phase change material can also be supplied in the form of a flow of fluid or gas that is flow into, circulates within and exits out of interior volume 40.

Endcap 12 may be formed of the same material that makes up housing 20 and may include additional layers of insulation or may be lined with insulation, e.g., a woven material or a non-woven material formed of loose, compressible fibers, such as Fiberfrax materials made by Unifax and other commercially available materials.

Phase change materials that may be utilized for phase change elements 14 can include solid-gas and liquid-gas phase change materials but are preferably solid-solid or solid-liquid phase change materials. The phase change materials may be sized and shaped into phase change elements 14 to fit into compartment 30, and more particularly to fit into sub-compartments such as subcompartments 30A-C. As shown in FIG. 1 and FIG. 4, phase change elements 14 may have a generally square or quadrilateral shape. It should be understood that other shapes, such as circular or triangular, to name a few, may also be used as long as they fit into compartment 30. Phase change materials may be provided in the form of a meltable solid, semi-solid or gel. Phase change materials may also be provided as packets or packages of such materials, and preferably of the reusable variety. Water or ice are examples of a suitable material. Other suitable materials known to those skilled in the art may also be used.

As previously mentioned, interior volume 40 may also be filled or partially filled with a phase change material. Preferably, the phase change material is a liquid-gas phase change material, one that can be introduced into the interior volume as a liquid and that will vaporize with heat absorption and exit vents 22 during processing. Water may be used as the phase change material and for some embodiments is the preferred phase change material because of its abundance, low cost, and non-toxic nature. Additionally, glycol, glycol solutions; e.g., ethylene glycol and water solutions, could also be used. Of course, other materials or liquids could be used regardless of cost or toxicity; however, they may represent less desirable alternatives used for selector specific applications.

In some embodiments, phase change materials can absorb large amounts of heat transferred through compartment wall 32. Liquid phase change materials may absorb sufficient heat to change from a liquid phase into a gas phase (e.g., steam in case of water). The gas or steam can be vented far behind the measuring point thermocouples while keeping the core interface below the vaporizing temperature. In some additional embodiments, a second phase change material, phase change elements 14, can be used in compartment 30 (e.g., in subcompartments 30A and 30C) alongside or adjacent to recording device 16 (e.g., in subcompartment 30B).

Suitable insulating materials that can used for insulation layers 25 and 34 include, but are not limited to, woven and non-woven materials such as Fiberfrax materials. These materials may also be used in endcap 12. Other insulating materials known to be suitable to those skilled in the art can also be used.

Device 16 may be an electronic component such as a temperature recording device. For example a temperature recording device may be placed within enclosure 10 and coupled with or connected to thermocouples that are located outside of the enclosure. Other data recording devices may be placed in enclosure 10 as device 16 to measure other process parameters.

According to another embodiment of the invention, a method of measuring a process parameter within the internal environment of high temperature processing equipment, such as an oven or furnace, is provided. In this embodiment, device 16 may be a process parameter recording device that is placed within enclosure 10. Device 16 can be coupled to a process parameter sensor that is located outside of the enclosure 10. Endcap 12 is placed over an open end of housing 20 to seal enclosure 10. After sealing enclosure 10, the loaded enclosure is placed within the internal environment of the high temperature processing equipment. The loaded enclosure may be placed in the internal environment prior to or after the materials to be processed are themselves loaded or conveyed into the internal environment. Once both the loaded enclosure and materials to be processed are placed in the internal environment, the desired process run is initiated. As the temperature within the enclosure rises, heat is absorbed by the phase change material disposed within internal volume 40. The liquid will then begin to vaporize (i.e., in the example of a phase change element that changes to a gas phase within the range of processing temperatures) and the vapor is vented from vents 22 of housing 20. It should be appreciated that in other examples, phase change elements 14 may only absorb heat and may or may not change phases, depending upon the type of phase change material used for phase change elements 14 and the amount of heat absorbed.

According to yet another embodiment of the invention, a method of measuring a process parameter within the internal environment of a processing oven or furnace, is provided. In this embodiment, device 16 may be a temperature recording device that is placed within enclosure 10. Device 16 can be connected to a thermocouple so that the thermocouple is located outside of the enclosure 10. Endcap 12 is placed over an open end of housing 20 to seal enclosure 10. After sealing enclosure 10, a loaded enclosure is placed within the internal environment of the furnace or oven. The loaded enclosure may be placed in the internal environment prior to or after the materials to be processed are themselves loaded or conveyed into the internal environment. Once both the loaded enclosure and materials to be processed are placed in the internal environment, the desired process run is initiated. As the temperature within the enclosure rises, heat is absorbed by the phase change material disposed within internal volume 40. If the phase change material is a material that vaporizes (e.g., one that changes to a gas phase from a liquid phase within the range of processing temperatures), the material will then begin to vaporize and the vapor is vented from vents 22 of housing 20. It should be appreciated that in some embodiments, the use of a phase change material disposed in interior volume 40 can be sufficient to protect device 16 and in other embodiments further protection can be provided with phase change elements 14 disposed in compartment 30. Father, phase change materials may only absorb heat (i.e., may not change phases) depending upon the type of phase change material used and the amount of heat absorbed.

In any of the method embodiments of the invention, once the processing run has concluded, enclosure 10 is removed from the internal environment. Phase change elements 14 and/or device 16 may then be removed (e.g., if cooling is required before returning them to use) and replaced as necessary. Also, if the phase change material introduced into interior volume 40 has not been completely vaporized out of enclosure 10 (i.e., in the example of a phase change material that changes to a gas phase from a liquid phase within the range of processing temperatures), remaining phase change material may be removed. Once reloaded and recharged with phase change materials, loaded enclosure 10 may again be placed in the internal environment of a furnace, oven or other high temperature process equipment for another process run.

Figure 6:
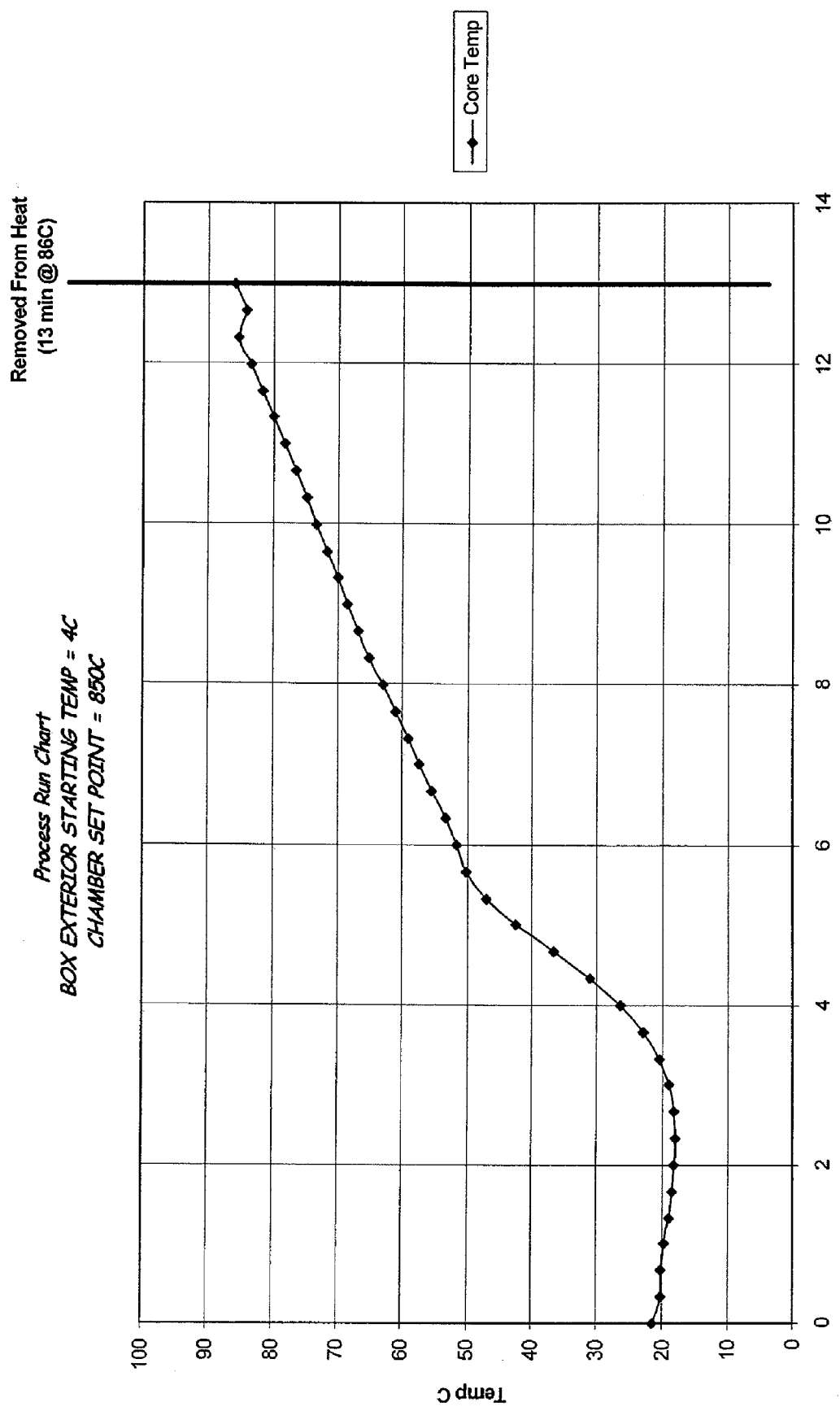
FIG. 6 is a graph plotting core temperature versus time during processing according to an embodiment of the invention.

Referring to FIG. 6, a graph plotting enclosure core temperature versus time is shown for a process run according to a method of the invention in a furnace chamber set for a peak temperature of 850° C. in the internal environment. As shown on the graph, internal core temperature reached 80° C. at about 13 minutes.

While a preferred embodiment of the present invention has been described, it should be understood that various changes, adaptations and modifications may be made therein without departing from the spirit of the invention and the scope of the appended claims.

What is claimed is:

1. A protective enclosure comprising: a housing having an internal surface and an external surface; a compartment within the housing for containing a least one heat absorbing element and at least one device to be protected, the compartment having a compartment external wall, a compartment internal wall and a compartment insulation layer disposed between the external compartment wall and the internal compartment wall; a jacket within the housing defined by an internal volume between at least a portion of the housing internal surface and the external compartment wall, the jacket configured to contain a liquid phase change material within the internal volume and to at least partially surround the compartment; and a vent operatively connected to the jacket and configured to release the liquid phase change material to an environment external to the housing when the liquid phase change material vaporizes.

2. The enclosure of claim 1, wherein the heat absorbing element comprises a phase change material.

3. The enclosure of claim 1, wherein the compartment is comprised of a first subcompartment for containing the device to be protected and a second subcompartment for containing the at least one heat absorbing element, the first and second subcompartments being adjacent to one another.

4. The enclosure of claim 1, wherein the heat absorbing element comprises a solid-solid phase change material or a solid-liquid phase change material.

5. The enclosure of claim 1, wherein the compartment is comprised of a plurality of subcompartments.

6. The enclosure of claim 1, wherein the compartment comprises at least three adjacent subcompartments, one subcompartment containing the device to be protected, and two of the at least three subcompartments containing a heat absorbing element.

7. The enclosure of claim 1, further comprising an endcap to seal an open end of the housing.

8. The enclosure of claim 1, wherein the housing has a housing external wall, a housing internal wall, and a housing insulation layer disposed between the housing external wall and the housing internal wall.

9. The enclosure of claim 1, wherein the compartment has a plurality of heat absorbing elements and one or more devices to be protected disposed within the compartment.

\* \* \* \* \*